(12) United States Patent
Zhang et al.

(10) Patent No.: US 10,867,155 B2
(45) Date of Patent: Dec. 15, 2020

(54) FINGERPRINT IDENTIFICATION DISPLAY PANEL AND FABRICATING METHOD THEREOF, FINGERPRINT IDENTIFICATION DISPLAY DEVICE

(71) Applicant: BOE TECHNOLOGY GROUP CO., LTD., Beijing (CN)

(72) Inventors: Hao Zhang, Beijing (CN); Shiming Shi, Beijing (CN); Meng Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/218,890

(22) Filed: Dec. 13, 2018

(65) Prior Publication Data

US 2019/0180073 A1     Jun. 13, 2019

(30) Foreign Application Priority Data

Dec. 13, 2017    (CN) .......................... 2017 1 1328903

(51) Int. Cl.
*G06K 9/00*     (2006.01)
*G06F 3/041*    (2006.01)

(52) U.S. Cl.
CPC ......... *G06K 9/0004* (2013.01); *G06F 3/0412* (2013.01); *G06K 9/00013* (2013.01)

(58) Field of Classification Search
CPC ................................................. G06K 9/00013
See application file for complete search history.

(56) References Cited

U.S. PATENT DOCUMENTS

2018/0060641 A1*   3/2018   Kim ................... G06K 9/00013

FOREIGN PATENT DOCUMENTS

| CN | 106298859 A | 1/2017 |
| CN | 106875842 A | 6/2017 |

OTHER PUBLICATIONS

First Office Action for Chinese Patent Application No. 201711328903.2 dated Dec. 30, 2019.

* cited by examiner

*Primary Examiner* — Abdul-Samad A Adediran
(74) *Attorney, Agent, or Firm* — Calfee, Halter & Griswold LLP

(57) ABSTRACT

A fingerprint identification display panel includes: a substrate; a plurality of sub-pixel regions including a plurality of first, second sub-pixel regions. A first driving circuit and a first light-emitting unit electrically connected thereto are sequentially disposed on the substrate and located in the plurality of first sub-pixel regions. A light shielding layer having through holes are disposed on the substrate. A plurality of light detection units are disposed at a side of the light shielding layer adjacent to the substrate, and corresponds to through holes one by one. At least one through hole is disposed in the second sub-pixel region, and a ratio of an area of an orthographic projection of the through hole on the substrate to an area of an orthographic projection of the second sub-pixel region on the substrate is greater than or equal to 30%.

8 Claims, 4 Drawing Sheets

FINGERPRINT IDENTIFICATION DISPLAY PANEL AND FABRICATING METHOD THEREOF, FINGERPRINT IDENTIFICATION DISPLAY DEVICE

CROSS REFERENCE

This application is based upon and claims priority to Chinese Patent Application No. 201711328903.2, filed on Dec. 13, 2017, the entire contents thereof are incorporated herein by reference.

TECHNICAL FIELD

The present disclosure relates to the field of display technologies, and in particular, to a fingerprint identification display panel and a fabricating method thereof, and a fingerprint identification display device.

BACKGROUND

Due to the uniqueness of the fingerprint pattern, the fingerprint identification technology developed therewith is widely used for personal authentication. According to different methods of fingerprint acquisition and input, optical imaging, thermal sensitive sensors, human infrared sensors and the like are widely used and well-known.

The optical fingerprint identification panel is a fingerprint identification product that is currently known, in which pixels are used to emit light which is reflected and refracted on the touch surface of the finger and the panel, and then the received light is detected to realize fingerprint identification.

SUMMARY

According to an aspect of present disclosure, a fingerprint identification display panel includes: a substrate; a plurality of sub-pixel regions defined by a plurality of gate lines and a plurality of data lines intersected; wherein the plurality of sub-pixel regions include a plurality of first sub-pixel regions and a plurality of second sub-pixel regions; a first driving circuit and a first light-emitting unit electrically connected with the first driving circuit are sequentially disposed on the substrate and located in the first sub-pixel region; a light shielding layer is disposed on the substrate and includes a plurality of through holes; a plurality of light detection units are disposed at a side of the light shielding layer adjacent to the substrate, and the plurality of through holes are disposed to correspond to the plurality of light detection units one by one, wherein: at least one of the plurality of through holes is disposed in the second sub-pixel region, and a ratio of an area of an orthographic projection of the through hole on the substrate to an area of an orthographic projection of the second sub-pixel region on the substrate is greater than or equal to 30%.

According to an embodiment of present disclosure, a second driving circuit and a second light-emitting unit electrically connected with the second driving circuit are disposed on the substrate and located in the second sub-pixel region, an orthographic projection of the second light-emitting unit on the substrate does not overlap with an orthographic projection of the through hole on the substrate, and an orthographic projection of the second driving circuit on the substrate does not overlap with the orthographic projection of the through hole on the substrate.

According to an embodiment of present disclosure, an area of the orthographic projection of the second driving circuit on the substrate is smaller than an area of an orthographic projection of the first driving circuit on the substrate.

According to an embodiment of present disclosure, a number of thin film transistors and capacitors included in the second driving circuit is smaller than a number of thin film transistors and capacitors included in the first driving circuit.

According to an embodiment of present disclosure, a color of light emitted by the second light-emitting unit is the same as a color of light emitted by the first light-emitting unit adjacent to the second sub-pixel region.

According to an embodiment of present disclosure, a second transparent cathode for driving the second light-emitting unit to emit light is disposed on the substrate and located in the second sub-pixel region, and a first transparent cathode for driving the first light-emitting unit to emit light is disposed on the substrate and located in the first sub-pixel region, the first transparent cathode and the second transparent cathode are formed in an integrated structure, and an orthographic projection of the second transparent cathode on the substrate covers the orthographic projection of the through hole on the substrate.

According to an embodiment of present disclosure, the second sub-pixel region is disposed adjacent to the first sub-pixel region, the first light-emitting unit located in the first sub-pixel region includes a first anode and a first light-emitting layer both extending to the second sub-pixel region, and orthographic projections of portions of the first light-emitting layer and the first anode extending to the second sub-pixel region on the substrate do not overlap with an orthographic projection of the through hole on the substrate.

According to an embodiment of present disclosure, the color of light emitted by the first light-emitting layer is green.

According to an embodiment of present disclosure, a first transparent cathode is disposed at a side of the first light-emitting layer away from the first anode, and the first transparent cathode covers a plurality of first sub-pixel regions and a plurality of second sub-pixel regions.

According to an embodiment of present disclosure, the ratio of the area of the orthographic projection of the through hole on the substrate to the area of the orthographic projection of the second sub-pixel region on the substrate is about 50%.

According to an embodiment of present disclosure, the plurality of second sub-pixel regions and the plurality of through holes is in one-to-one correspondence;

According to another aspect of present disclosure, a fingerprint identification display device includes the fingerprint identification display panel of present disclosure.

According to still another aspect of present disclosure, a fabricating method for a fingerprint identification display panel, which includes a plurality of sub-pixel regions defined by a plurality of gate lines and a plurality of data lines intersected, the plurality of sub-pixel regions including a plurality of first sub-pixel regions and a plurality of second sub-pixel regions, the fabricating method includes:

providing a substrate;

forming a first driving circuit and a first light-emitting unit electrically connected with the first driving circuit sequentially on the substrate and in the first sub-pixel region;

forming a light shielding layer having a plurality of through holes on the substrate;

forming a plurality of light detection units at a side of the light shielding layer adjacent to the substrate, and the plurality of through holes corresponds to the plurality of light detection units one by one, wherein:

at least one of the plurality of through holes is disposed in the second sub-pixel region, and a ratio of an area of an orthographic projection of the through hole on the substrate to an area of an orthographic projection of the second sub-pixel region on the substrate is greater than or equal to 30%.

The above general description and the following detailed description are intended to be illustrative and not restrictive of present disclosure.

BRIEF DESCRIPTION OF THE DRAWINGS

The accompanying drawings are incorporated in and constitute part of the specification, show the embodiments of present disclosure and are intended to explain the principle of present disclosure together with the description. It is apparent that the accompanying drawings in the following description are only some of the embodiments of present disclosure, and other drawings may be obtained from these accompanying drawings by those skilled in the art without any creative work.

DETAILED DESCRIPTION

Figure 1:
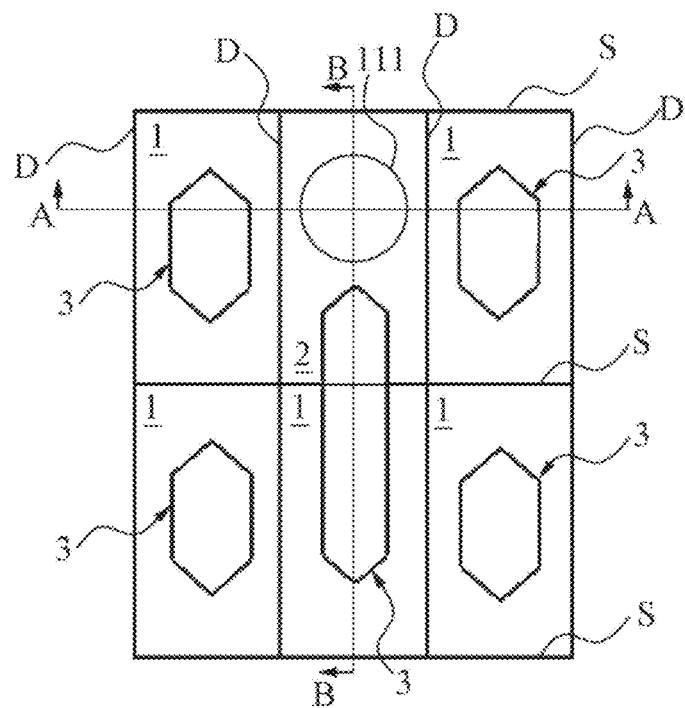
FIG. 1 schematically shows a schematic structural view of a first embodiment of a fingerprint identification display panel of present disclosure.

Example embodiments will now be described more fully with reference to the accompanying drawings. However, the example embodiments can be embodied in a variety of forms, and should not be construed as limitation of the examples set forth herein; rather, these embodiments are provided so that this disclosure will be thorough and complete, and the concepts of the example embodiments will be fully given to those skilled in the art. The described features, structures, or characteristics may be combined in one or more embodiments in any suitable manner. In the following description, numerous specific details are provided in order to fully understand the embodiments of present disclosure. However, those skilled in the art will appreciate that one or more of specific details may be omitted when technical solutions of present disclosure is implemented, or other methods, components, devices, steps, etc. may be employed. In other instances, the widely-known technical solutions will not be shown or described in detail so as to avoid obscuring various aspects of present disclosure.

The drawings are only illustrative of present disclosure and are not necessarily to scale. In the drawings, like reference numbers generally refer to the same or similar components, and thus the repeated description thereof will be omitted.

In the related art, a fingerprint identification display panel includes a light-emitting pixel, a light shielding layer having through holes thereon, and a photodetector disposed at the other side of the light shielding layer. The light-emitting pixel emits light, and the light is then reflected by the touch interface touched by the finger. The reflected light is incident on the photodetector through the through hole of the light shielding layer, and then the received light is detected by the photodetector to realize fingerprint identification. However, in order not to affect display, the through hole is usually disposed between adjacent light-emitting pixels, and thus the area of the through holes is small, so that the light received by the photodetector is limited, and cannot be accurately detected.

In present disclosure, by providing a through hole in the sub-pixel region, it is possible to enable the area ratio of the through hole larger, for example, a ratio of the area of the orthographic projection of the through hole on the substrate to the area of the orthographic projection of the sub-pixel region on the substrate is greater than or equal to 30%, or even greater than 40%, thereby ensuring the photodetector to receive more light, and effectively improving detection accuracy.

Figure 2:
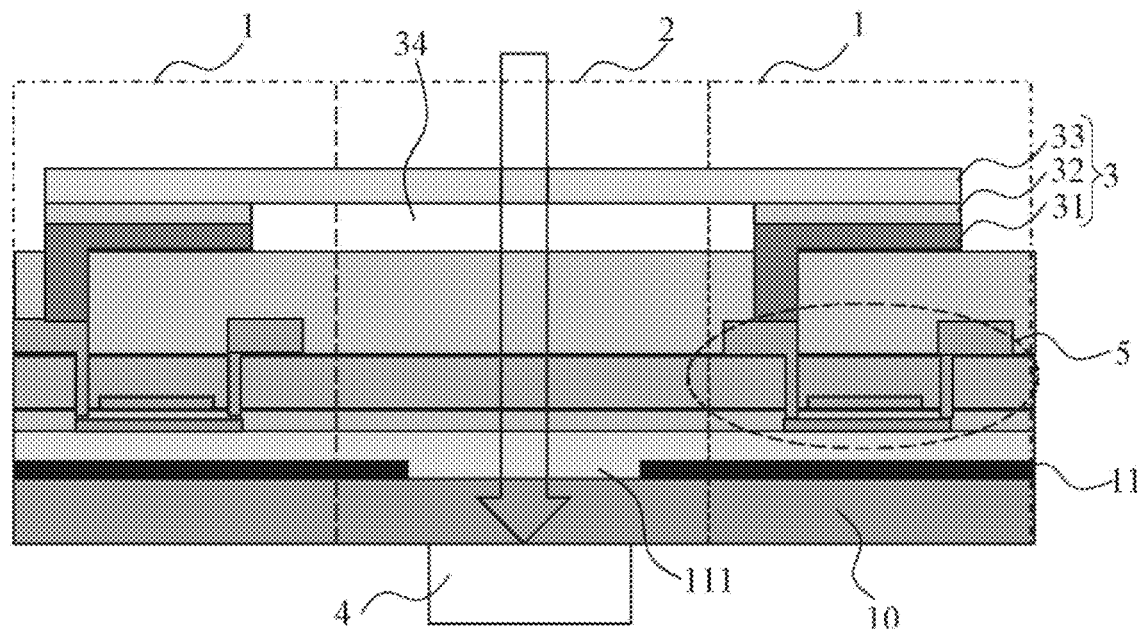
FIG. 2 is a cross-sectional view taken along line A-A of FIG. 1.
Figure 3:
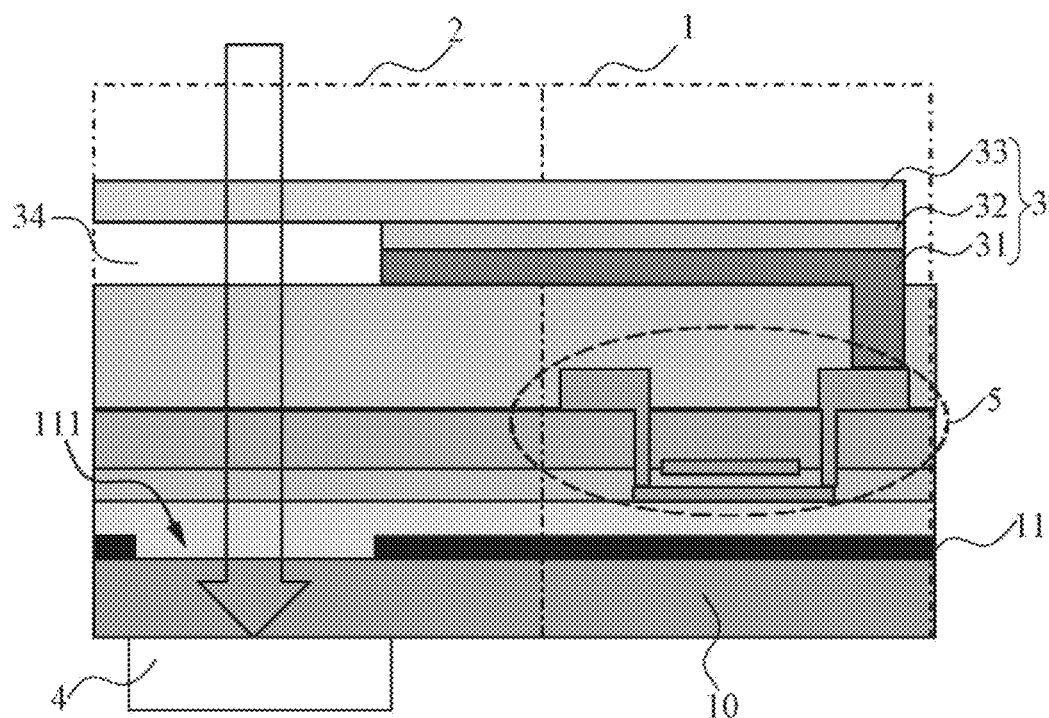
FIG. 3 is a cross-sectional view taken along line B-B of FIG. 1.

Referring to FIGS. 1, 2 and 3, FIG. 1 schematically shows a schematic structural view of a first embodiment of a fingerprint identification display panel of present disclosure; FIG. 2 is a cross-sectional view taken along line A-A of FIG. 1; and FIG. 3 is a cross-sectional view taken along line B-B of FIG. 1.

As shown in FIG. 1, a first embodiment of the fingerprint identification display panel of present disclosure includes a substrate 10 and a plurality of sub-pixel regions defined by a plurality of gate lines S and a plurality of data lines D intersected. The plurality of sub-pixel regions include a plurality of first sub-pixel regions 1 and a plurality of second sub-pixel regions 2.

As shown in FIGS. 1 and 2, a first driving circuit 5 and a first light-emitting unit 3 electrically connected with the first driving circuit 5 are sequentially disposed on the substrate 10 and located in the plurality of first sub-pixel regions 1. The first driving circuit can adopt a 7T2C circuit. Of course, in other exemplary embodiments of present disclosure, the first driving circuit 5 may further include other devices. For example, in order to implement a threshold compensation function, the first driving circuit 5 may further include a compensation transistor and more capacitive devices, and the like. This will not be particularly limited in the exemplary embodiment.

A light shielding layer 11 is disposed on the substrate 10, and the light shielding layer 11 includes a plurality of through holes 111. The through hole 111 is circular in this embodiment, while the through hole 111 is not limited to be circular and may be rectangular, elliptical or the like in other embodiments. A plurality of light detection units 4 are disposed at a side of the light shielding layer 11 adjacent to the substrate, and the light detection unit 4 may be a photosensitive diode, a phototriode, a CCD or the like. As shown in FIG. 2, the light detection unit 4 is disposed on the substrate 10. In other embodiments, the light detection unit 4 is disposed on the light shielding layer 11, as long as the light detection unit 4 is disposed at a side adjacent to the substrate 10. The plurality of through holes 111 and the plurality of light detection units 4 are correspondingly disposed one by one, wherein "correspondingly disposed"

means that a projection of the through hole 111 on the substrate 10 overlaps with a projection of the light detection unit 4 on the substrate 10. For example, projections of the light detection units 4 on the substrate 10 are all within projections of the through holes on the substrate 10, and further located at a central position of projections of the through holes 111 on the substrate 10.

At least one of the plurality of through holes 111 is disposed in the second sub-pixel region 2, and the through hole 111 may be located at a central position of the second sub-pixel region 2 and may be offset in any direction according to the actual requirements. A ratio of an area of an orthographic projection of the through hole 111 on the substrate 10 to an area of an orthographic projection of the second sub-pixel region 2 on the substrate 10 is about 50%, in which "50%" is not an absolute value, however, an error of about +−10% is allowed. That is, in other embodiments, the ratio of the area of the orthographic projection of the through hole 111 on the substrate 10 to the area of the orthographic projection of the second sub-pixel region 2 on the substrate 10 may be in the range of 45% to 55%. In present disclosure, by providing the through hole 111 in the second sub-pixel region 2, i.e., in the region where the sub-pixel is located, the area of the through hole 111 may be conveniently increased to ensure the light detection unit 4 to receive more light, thereby improving detection accuracy. Moreover, the plurality of second sub-pixel regions and the plurality of through holes is in one-to-one correspondence which means each of the plurality of through holes 111 is disposed in the each of the plurality of second sub-pixel regions.

As shown in FIGS. 1 and 3, the second sub-pixel region 2 is disposed adjacent to the first sub-pixel region 1, and the first light-emitting unit 3 located at the first sub-pixel region 1 includes a first anode 31 and a first light-emitting layer 32. The first anode 31 and the first light-emitting layer 32 both extend to the second sub-pixel region 2, and may solve for the problem of light-emitting unevenness caused by the second sub-pixel region 2 lacking the light-emitting unit, thereby avoiding affecting display. As shown in FIG. 1, in order to clearly show a boundary between the second sub-pixel region 2 and the first sub-pixel region 1, the gate line S is a continuous solid line, which does not mean that the first anode 31 or the first light-emitting layer 32 is physically cut off by the gate line S.

Around the second sub-pixel region 2, there are disposed a plurality of first sub-pixel regions 1 adjacent thereto. Colors of the light-emitting display sub-pixels in the first sub-pixel region 1 are, for example, red, green and blue. Since the human eye is sensitive to green, the green light-emitting sub-pixel may be selected to extend to the second sub-pixel region 2, which is advantageous for avoiding the influence on the display effect. Of course, in other embodiments, it is not limited to enable the green light-emitting display sub-pixel in the first sub-pixel region 1 to extend to the second sub-pixel region 2, and the red or blue light-emitting sub-pixel may be selected to extend to the second sub-pixel region 2.

Orthographic projections of portions of the first light-emitting layer 32 and the first anode 31 extending to the second sub-pixel region 2 on the substrate 10 do not overlap with the orthographic projection of the through hole 111 on the substrate 10, i.e., there is no overlapped portion therebetween. At the same time, the orthographic projection of the first driving circuit 5 of the first sub-pixel region 1 does not overlap with the orthographic projection of the second sub-pixel region 2 on the substrate 10, i.e., there is no overlapped portion therebetween, which avoids the light emitted from the first light-emitting layer 32 is incident on the light detecting unit 4 through the through hole 111 to cause interference, and affect detection effect. In this embodiment, by extending the first light-emitting layer 32 and the first anode 31 to the second sub-pixel region 2, and avoiding projections of the first light-emitting layer 32 and the through hole 111 on the substrate 2 from overlapping, so that the detection accuracy is ensured and the display effect is enhanced.

The first transparent cathode 33 is disposed at a side of the first light-emitting layer 32 away from the first anode 31, i.e., the first anode 31 and the first transparent cathode 33 are disposed at both sides of the first light-emitting layer 32. Further, the first light-emitting layer 32 may further include an auxiliary film layer (not shown) such as an electron transport layer, a hole transport layer, or the like. A pixel dielectric layer 34 is formed under the first transparent cathode 33, between the first anode 31, the first light-emitting layer 32 of the first sub-pixel region 1 and the first anode 31, the first light-emitting layer 32 of the second sub-pixel region 2.

The first transparent cathode 33 covers the plurality of first sub-pixel regions 1 and the plurality of second sub-pixel regions 2. In an embodiment, the color of the light emitted by the first light-emitting layer 32 may be green. Since the human eye is sensitive to green, by extending the green sub-pixel to the second sub-pixel region 2 having the through hole 111, even if the second sub-pixel region 2 is not provided with the green light-emitting layer, the display effect will not be greatly affected. In other embodiments, the color of the light emitted by the first light-emitting layer 32 may also be red, blue, or the like.

In the embodiment shown in FIG. 3, the first anode 31 and the first light-emitting layer 32 of the first light-emitting unit 3 extend to the second sub-pixel region 2 provided with the through hole 111 and the light detecting unit 4, and may compensate for light in the and solve the problem of light-emitting unevenness caused by the second sub-pixel region 2 lacking the light-emitting unit; At the same time, the projections of the first light-emitting layer 32 and the through-hole 111 on the substrate 2 do not overlap, so as to avoid interference on the light-to-light detection unit 4 caused by light emitted by the first light-emitting layer 32. Therefore, the fingerprint identification display panel of this embodiment improves both fingerprint identification accuracy and display effect of the display panel.

Figure 4:
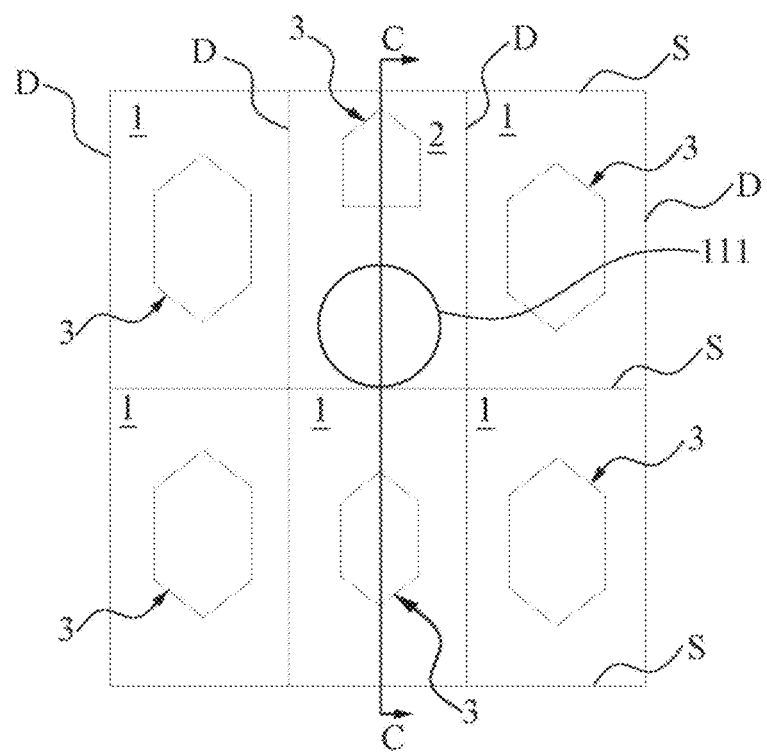
FIG. 4 schematically shows a schematic structural view of a second embodiment of a fingerprint identification display panel of present disclosure.
Figure 5:
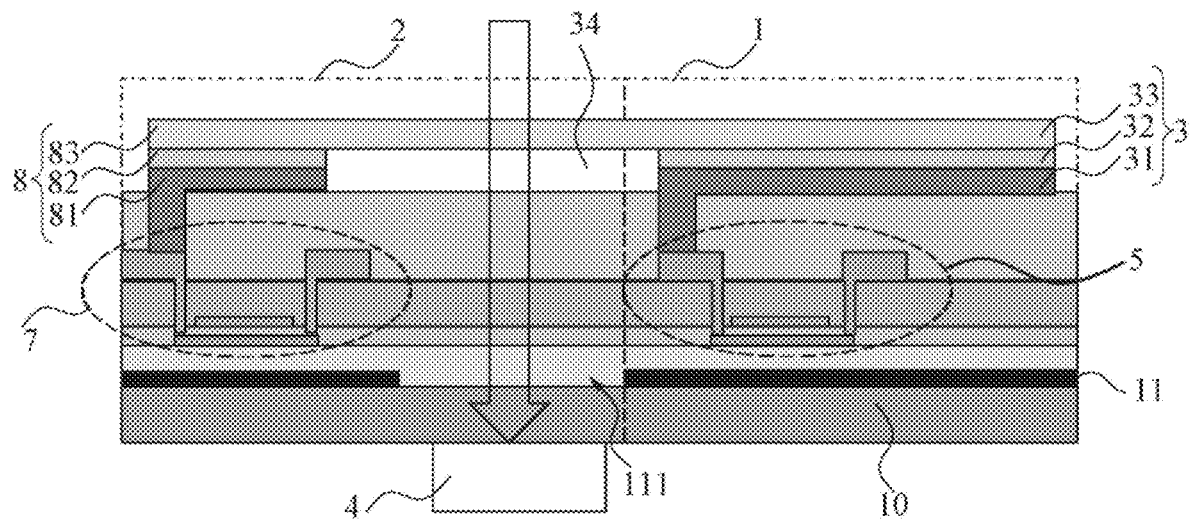
FIG. 5 is a cross-sectional view taken along line C-C of FIG. 4.

Referring to FIGS. 4 and 5, FIG. 4 schematically shows a schematic structural view of a second embodiment of a fingerprint identification display panel of present disclosure; and FIG. 5 is a cross-sectional view taken along line C-C of FIG. 4.

As shown in FIGS. 4 and 5, the second embodiment of the fingerprint identification display panel of present disclosure includes a substrate 10 and a plurality of sub-pixel regions defined by a plurality of gate lines S and a plurality of data lines D intersected.

A first driving circuit 5 and a first light-emitting unit 3 electrically connected with the first driving circuit 5 are sequentially disposed on the substrate 10 and located in the plurality of first sub-pixel regions 1.

A light shielding layer 11 is disposed on the substrate 10, and the light shielding layer 11 includes a plurality of through holes 111; a plurality of light detection units 4 are disposed at a side of the light shielding layer 11 adjacent to the substrate 10. The plurality of through holes 111 and the plurality of light detection units 4 are correspondingly disposed one by one. At least one of the plurality of through holes 111 is disposed in the second sub-pixel region 2, and a ratio of an area of an orthographic projection of the through hole 111 on the substrate 10 to an area of an orthographic projection of the second sub-pixel region 2 on the substrate 10 is about 50%.

A second driving circuit 7 and a second light-emitting unit 8 electrically connected with the second driving circuit 7 are disposed on the substrate 10 and located in the second sub-pixel region 2, and the orthographic projection of the second light-emitting unit 8 on the substrate 10 does not overlap with the orthographic projection of the through hole on the substrate 10, i.e., there is no overlapped portion therebetween, and the orthographic projection of the second driving circuit 7 on the substrate 10 does not overlap with the orthographic projection of the through hole 111 on the substrate 10, i.e., there is no overlapped portion therebetween. This avoids the light emitted by the first light-emitting layer 32 is incident on the light detecting unit 4 through the through hole 111 to cause interference, and affect detection effect. In this embodiment, the second light-emitting unit 8 is disposed on the substrate 10 and located in the second sub-pixel region 2, and projections of the second light-emitting unit 8 and the through hole 111 on the substrate 2 is avoided from overlapping, so that the detection accuracy is ensured and the display effect is enhanced. The area of the orthographic projection of the second driving circuit 7 on the substrate 10 is smaller than the area of the orthographic projection of the first driving circuit 5 on the substrate 10.

The second driving circuit 7 may be, for example, a 2T1C circuit, and the number of thin film transistors and capacitors included in the second driving circuit is smaller than the number of thin film transistors and capacitors included in the first driving circuit 5.

The color of the light emitted by the second light-emitting unit 8 may be the same as the color of the light emitted by the first light-emitting unit 3 adjacent to the second sub-pixel region 2.

The second light-emitting unit 8 may include a second anode 81 and a second light-emitting layer 82. A second transparent cathode 83 for driving the second light-emitting unit 8 to emit light is disposed on the substrate 10 and located in the second sub-pixel region 2. The orthographic projection of the second transparent cathode on the substrate 10 covers the orthographic projection of the through hole 111 on the substrate 10. The second transparent cathode 83 and the first transparent cathode 33 may be formed in an integrated structure, i.e., disposed in a whole layer, so that they can be fabricated in the same process. A pixel dielectric layer 34 is formed under the first transparent cathode 83, between the first anode 31, the first light-emitting layer 32 of the first sub-pixel region 1 and the first anode 81, the first light-emitting layer 82 of the second sub-pixel region 2.

Around the second sub-pixel region 2, there are disposed a plurality of first sub-pixel regions 1 adjacent thereto. Colors of the light-emitting display sub-pixels in the first sub-pixel region 1 are, for example, red, green and blue. Since the human eye is sensitive to green, the second sub-pixel region 2 may be selected to provide the green light-emitting display sub-pixel, which is advantageous for avoiding the influence on the display effect. Of course, in other embodiments, the color of the light-emitting display sub-pixels disposed in the second sub-pixel region 2 is not limited to green, and red or blue light-emitting display sub-pixels may also be used.

In the embodiment shown in FIG. 5, in the second sub-pixel region 2 provided with the through hole 111 and the light detecting unit 4, the second light-emitting unit 8 is added to compensate for light and solve the problem of light-emitting unevenness caused by the second sub-pixel region 2 lacking the light-emitting unit; At the same time, projections of the second light-emitting unit 8 and the through-hole 111 on the substrate 2 do not overlap, so as to avoid interference on the light-to-light detection unit 4 caused by light emitted by the second light-emitting unit 8. Therefore, the fingerprint identification display panel of this embodiment improves both fingerprint identification accuracy and display effect of the display panel.

Figure 6:
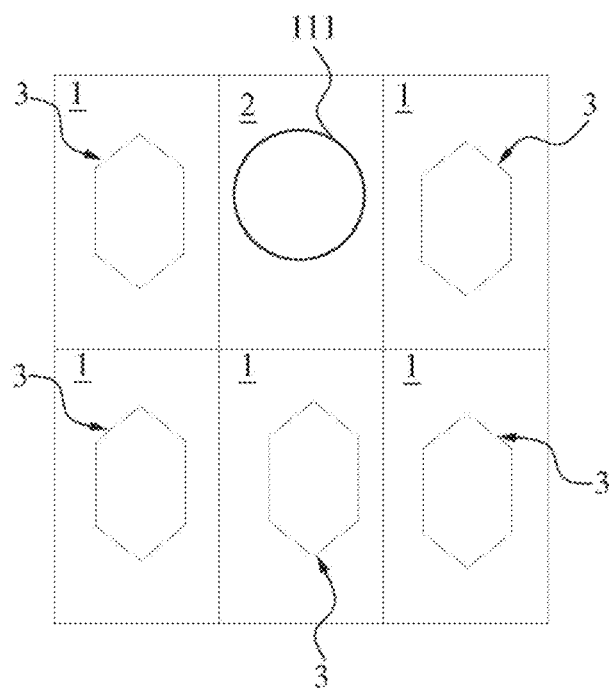
FIG. 6 schematically shows a schematic structural view of a third embodiment of a fingerprint identification display panel of present disclosure.

Referring to FIG. 6, FIG. 6 schematically shows a schematic structural view of a third embodiment of a fingerprint identification display panel of present disclosure. The fingerprint identification display panel of this embodiment is different from the embodiment shown in FIG. 5 in that there is no sub-pixel disposed in the second sub-pixel region 2, and other structures are basically the same as the embodiment shown in FIG. 5, which will not be repeated herein.

The fingerprint identification display device of present disclosure includes the fingerprint identification display panel previously described in present disclosure and a circuit electrically connected with the light detection unit 4.

Figure 7:
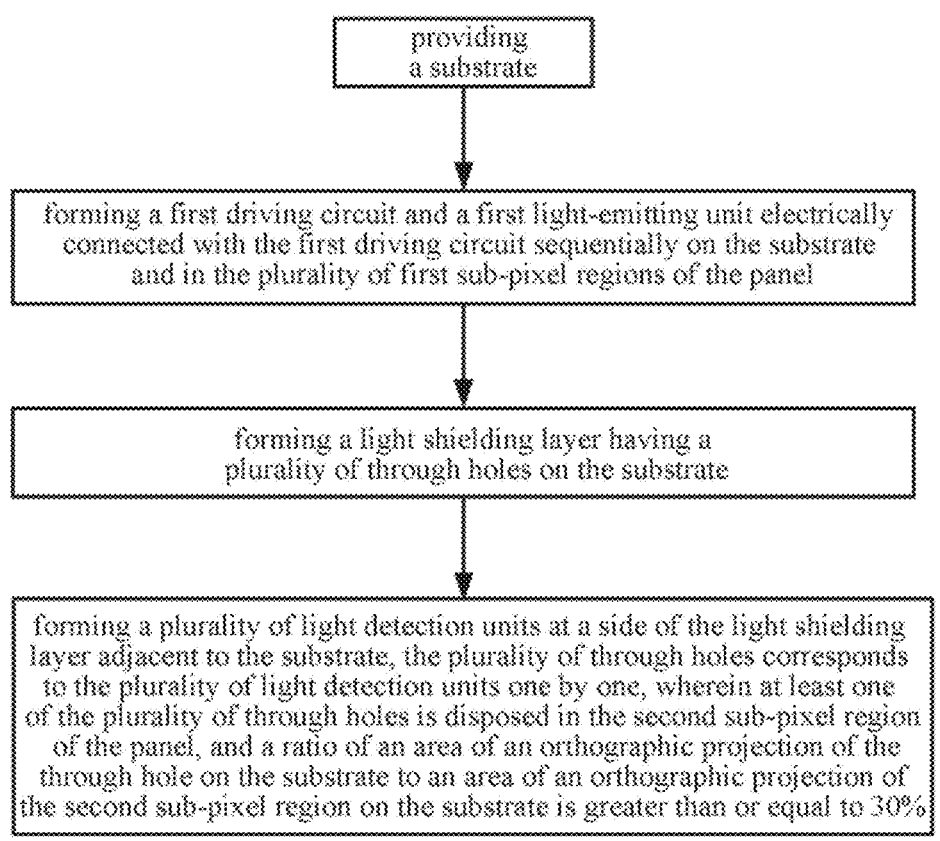
FIG. 7 is a process flow diagram of a fabricating method of a fingerprint identification display panel of present disclosure.

Referring to FIG. 7, FIG. 7 is a process flow diagram of a fabricating method of a fingerprint identification display panel of present disclosure. As shown in FIG. 7, a fabricating method for a fingerprint identification display panel according to present disclosure is provided. The panel includes a plurality of sub-pixel regions defined by a plurality of gate lines S and a plurality of data lines D intersected, and the plurality of sub-pixel regions include a plurality of first sub-pixel regions 1 and a plurality of second sub-pixel regions 2. The fabricating method includes:

providing a substrate;

forming a first driving circuit and a first light-emitting unit electrically connected with the first driving circuit sequentially on the substrate and in the plurality of first sub-pixel regions;

forming a light shielding layer having a plurality of through holes on the substrate;

forming a plurality of light detection units at a side of the light shielding layer adjacent to the substrate, the plurality of through holes corresponds to the plurality of light detection units one by one, wherein at least one of the plurality of through holes is disposed in the second sub-pixel region, and a ratio of an area of an orthographic projection of the through hole on the substrate to an area of an orthographic projection of the second sub-pixel region on the substrate is greater than or equal to 30%.

Various steps in the fabricating method for the fingerprint identification display panel described above are not limited in sequence and may be interchanged.

The features, structures, or characteristics described above may be combined in one or more embodiments in any suitable manner, and the features discussed in the various embodiments are interchangeable, if possible. In the following description, numerous specific details are provided in order to fully understand the embodiments of present disclosure. However, the person skilled in the art will appreciate that the technical solution of present disclosure may be practiced without one or more of the specific details, or other methods, components, materials and the like may be employed. In other instances, well-known structures, materials or operations are not shown or described in detail to avoid obscuring aspects of present disclosure.

Other embodiments of present disclosure will be apparent to those skilled in the art after reading the specification and implementing present disclosure disclosed herein. The present application is intended to cover any variations, purposes, or adaptations of present disclosure, which are in accordance with the general principles of present disclosure and include common general knowledge or conventional technical means in the art that are not disclosed in present disclosure. The specification and embodiments are to be regarded as illustrative only, and the real scope and spirit of present disclosure is defined by the attached claims.

What is claimed is:

1. A fingerprint identification display panel comprising: a substrate; a plurality of sub-pixel regions defined by a plurality of gate lines and a plurality of data lines intersected; wherein: the plurality of sub-pixel regions comprise a plurality of first sub-pixel regions and a plurality of second sub-pixel regions; a first driving circuit and a first light-emitting unit electrically connected with the first driving circuit are sequentially disposed on the substrate and located in each of the plurality of first sub-pixel regions; a light shielding layer is disposed on the substrate and comprises a plurality of through holes; a plurality of light detection units are disposed at a side of the light shielding layer adjacent to the substrate, and the plurality of through holes are disposed to correspond to the plurality of light detection units one by one, wherein:
the plurality of through holes are disposed in the second sub-pixel regions in one-to-one correspondence, and a ratio of an area of an orthographic projection of the through hole on the substrate to an area of an orthographic projection of the second sub-pixel region on the substrate is greater than or equal to 30%,
wherein the orthographic projection is a projection in which a surface mapped using parallel lines to project its shape onto a plane,
wherein second driving circuits and second light-emitting units electrically connected with the second driving circuits are disposed on the substrate and located in the second sub-pixel regions respectively, an orthographic projection of the second light-emitting unit on the substrate does not overlap with the orthographic projection of the through hole on the substrate, and an orthographic projection of the second driving circuit on the substrate does not overlap with the orthographic projection of the through hole on the substrate.

2. The fingerprint identification display panel according to claim 1, wherein an area of the orthographic projection of the second driving circuit on the substrate is smaller than an area of an orthographic projection of the first driving circuit on the substrate.

3. The fingerprint identification display panel according to claim 2, wherein the number of thin film transistors and capacitors comprised in the second driving circuit is smaller than the number of thin film transistors and capacitors comprised in the first driving circuit.

4. The fingerprint identification display panel according to claim 3, wherein colors of light emitted by the second light-emitting units are the same as colors of light emitted by the first light-emitting units adjacent to the second sub-pixel regions respectively.

5. The fingerprint identification display panel according to claim 1, wherein second transparent cathodes for driving the second light-emitting units to emit light are disposed on the substrate and located in the second sub-pixel regions, and first transparent cathodes for driving the first light-emitting units to emit light are disposed on the substrate and located in the first sub-pixel regions respectively, the first transparent cathodes and the second transparent cathodes are formed in an integrated structure, and an orthographic projection of the second transparent cathode on the substrate covers the orthographic projection of the through hole on the substrate.

6. The fingerprint identification display panel according to claim 1, wherein the ratio of the area of the orthographic projection of the through hole on the substrate to the area of the orthographic projection of the second sub-pixel region on the substrate is about 50%.

7. A fingerprint identification display device comprising the fingerprint identification display panel according to claim 1.

8. A fabricating method for a fingerprint identification display panel, the panel comprising a plurality of sub-pixel regions defined by a plurality of gate lines and a plurality of data lines intersected, the plurality of sub-pixel regions comprising a plurality of first sub-pixel regions and a plurality of second sub-pixel regions, the fabricating method comprises:
providing a substrate;
forming a first driving circuit and a first light-emitting unit electrically connected with the first driving circuit sequentially on the substrate and in each of the first sub-pixel regions;
forming a light shielding layer having a plurality of through holes on the substrate;
forming a plurality of light detection units at a side of the light shielding layer adjacent to the substrate, and disposing the plurality of through holes to correspond to the plurality of light detection units one by one, wherein:
the plurality of through holes are disposed in the second sub-pixel regions in one-to-one correspondence, and a ratio of an area of an orthographic projection of the through hole on the substrate to an area of an orthographic projection of the second sub-pixel region on the substrate is greater than or equal to 30%,
wherein the orthographic projection is a projection in which a surface mapped using parallel lines to project its shape onto a plane,
wherein second driving circuits and second light-emitting units electrically connected with the second driving circuits are disposed on the substrate and located in the second sub-pixel regions respectively, an orthographic projection of the second light-emitting unit on the substrate does not overlap with the orthographic projection of the through hole on the substrate, and an orthographic projection of the second driving circuit on the substrate does not overlap with the orthographic projection of the through hole on the substrate.

* * * * *